United States Patent [19]

Uchida et al.

[11] 4,441,704
[45] Apr. 10, 1984

[54] THREE DIRECTION CHANGEABLE GUIDE DEVICE FOR USE IN A BANK NOTE HANDLING MACHINE

[75] Inventors: Isamu Uchida; Yoshiyuki Imamura, both of Tokyo, Japan

[73] Assignee: Luarel Bank Machine Co., Ltd., Tokyo, Japan

[21] Appl. No.: 325,009

[22] Filed: Nov. 25, 1981

[30] Foreign Application Priority Data

Dec. 5, 1980 [JP] Japan .................... 55-175417[U]

[51] Int. Cl.³ .............................. B65H 29/58
[52] U.S. Cl. ................................... 271/303
[58] Field of Search ............. 271/303, 305, 289, 290

[56] References Cited

U.S. PATENT DOCUMENTS 2,668,483 2/1954 Sykes .................... 271/303 X
3,750,880 8/1973 Petrovosky .............. 271/305 X Primary Examiner—Richard A. Schacher
Attorney, Agent, or Firm—Perman & Green

[57] ABSTRACT

A three direction changeable device comprises first forks and second forks. The first forks are disposed to selectively obstruct the movement of bank notes in a first direction. The second forks are disposed to selectively obstruct the movement of bank notes in a second direction. Each first fork is associated with a second fork and is disposed adjacent thereto to define therebetween a path for bank notes in a third direction when the first forks and second forks obstruct the movement of the bank notes in the first and second directions, respectively.

5 Claims, 3 Drawing Figures

THREE DIRECTION CHANGEABLE GUIDE DEVICE FOR USE IN A BANK NOTE HANDLING MACHINE

BACKGROUND OF THE INVENTION

This invention relates to a three direction changeable guide device for use in a conveying section provided within a bank note handling machine such as a bank note deposit machine, a bank note discriminating machine, etc.

The three direction changeable guide device is used to selectively guide bank notes into one of three directions in accordance with the kind of bank notes, genuineness of the bank notes, etc.

FIG. 1 shows a conventional three direction changeable guide device in the conveying section of a bank note handling machine.

The guide device includes a number of parallel belts 16 which are laterally disposed and horizontally run in the direction of arrow A. Only one of the belts 16 and one set of pulleys and forks appears in FIG. 1. The other belts, pulleys and forks which will be described hereinafter are laterally disposed in the same manner. Although the guide device is constituted of a number of sets of belts, pulleys and forks, since the operation of these sets is identical, the following description will be limited to one set only. A Pulley 12 engages with a belt 16 from their upper side to hold the belt 16 in the proper position. The pulley 12 may be used to drive the belt 16.

A belt 17 engages with the lower side of belt 16 from the lower side thereof and then deflected downwardly in the direction of the arrow D over a pulley 14 disposed just below the pulley 12. Another belt 18 is trained on a pulley 15 disposed adjacent the pulley 14. The pulley 15 causes the belt 18 to run toward the pulley 14, to engage with the belt 17 and, thereafter, to be deflected in the direction of the arrow C.

A first fork 10 is disposed adjacent and downstream of the pulleys 12 and 14. The first fork 10, which is of generally triangular shape, has one straight side surface 10b and another side surface 10a with a curved portion 10c. The straight side surface 10b of the fork 10 faces the belt 16. The first fork 10 is adapted to be swung so as to change the direction of the movement of bank notes being transferred in the direction of the arrow A while held between the belts 16 and 17. More particularly, when the fork 10 is swung to upwardly project above the level of the belt 16 as shown in solid lines in FIG. 1, the bank notes being transferred are obstructed in their forward travel by the fork 10 and are, therefore, downwardly deflected along the belt 17 in the direction of the arrow D. On the other hand, when the fork 10 swung below the level of the belt 16 as shown in dotted lines in FIG. 1, the bank notes being transferred are not obstructed by the fork 10 and are, therefore, horizontally transferred further in the direction of the arrow B.

A second fork 11 is disposed adjacent and downstream of the pulleys 14 and 15. Its shape is the same as that of the first fork 10. That is, the fork 11 has one straight side surface 11b and another side surface 11a with a curved portion 11c. The straight side surface 11b of the fork 11 faces the belt 17. In a similar manner to the fork 10, the fork 11 is adapted to be swung so as to change the direction of movement of bank notes. More particularly, when the fork 11 is swung upwardly to project above the belt 17 as shown in solid lines in FIG. 1, the bank notes which are conveyed along the pulley 14 are obstructed by the fork 11 and, therefore, deflected along the belt 18 in the direction of the arrow C. When the fork 11 is swung below the belt 17 as shown in dotted lines in FIG. 1, the bank notes being transferred are not obstructed by the fork 11 and are, therefore, further conveyed in the direction of the arrow D.

In the above construction, when the fork 10 is in the position shown in solid lines and the fork 11 is in the position shown in solid lines, the bank notes are transferred first along the belt 16, then along the pulley 14 and finally along the belt 18 in the direction of the arrow C. That is, the bank notes are transferred along an abruptly curved zigzag path or in a reversed "S"-shaped path. Because of this, the conventional guide device has the disadvantage that the bank notes are sometimes not transferred smoothly or become jammed.

Another guide device which has been proposed to eliminate the above mentioned disadvantage is shown in FIG. 2. In this guide device, another pulley 14' is provided adjacent the pulley 14 and another pulley 15' is provided adjacent the pulley 15 so that the distance between the forks 10 and 11 along the path of the belt 17 is increased to eliminate the abruptly curved zigzag path. Although this construction can eliminate the above-mentioned disadvantage, it has another disadvantage in that the guide device becomes complicated in construction because of the increased number of pulleys.

SUMMARY OF THE INVENTION

It is, therefore, an object of the present invention to provide a novel three direction changeable guide device for use in a bank note handling machine which eliminates the above-mentioned disadvantages of the prior art, and which is very simple in construction and can guide bank notes smoothly.

According to the present invention, there is provided a three direction changeable guide device for use in a bank note handling machine in which bank notes are conveyed and selectively guided into one of these directions which comprises: a number of first belts disposed to transfer the bank notes in a first direction therealong, a like number of second belts one each disposed to partially engage with one of the first belts and to transfer the bank notes in a second direction along the second belts a like numbers of pulleys one each disposed to deflect one of the second belts from the first direction to seemed direction, a like number of first forks one each disposed adjacent and downstream of one of the pulleys in the first direction and adapted to swingably project above the level of the first belts to obstruct the movement of the bank notes in the first direction, and a like number of second forks one each disposed adjacent and downstream of one of the pulleys and the first forks and adapted to swingably project above the level of the second belts to obstruct the movement of the bank notes in the second direction, the first forks and the second forks being disposed to define therebetween a path for bank notes in a third direction when the first forks obstruct the movement of the bank notes in the first direction and the second forks hinder the movement of the bank notes in the second direction.

DESCRIPTION OF THE DRAWINGS

Other objects and advantages of the present invention will become apparent from the following description made with reference to the accompanying drawings, in which.

DESCRIPTION OF THE PREFERRED EMBODIMENT

One embodiment of the present invention will be now be described in detail with reference to the accompanying drawings. Again the description will be made in respect of one set of components, on the understanding that the other sets operate in the same manner.

Figure 1:
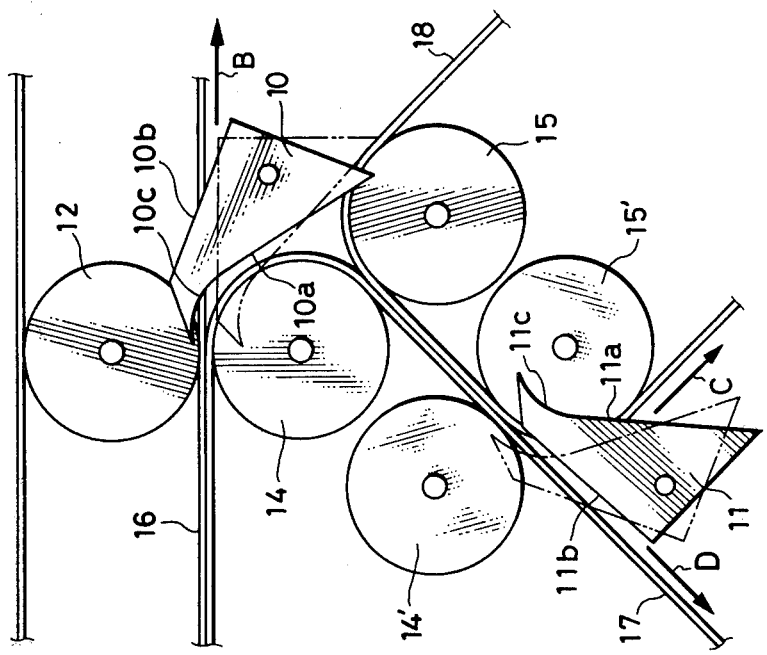
FIG. 1 is a side view showing a guide device of prior art.
Figure 2:
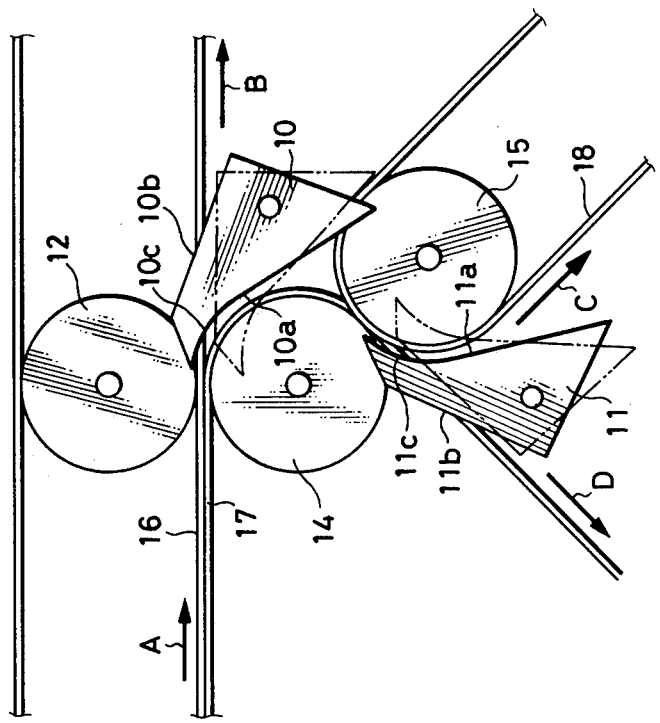
FIG. 2 is a side view showing another guide device of prior art.
Figure 3:
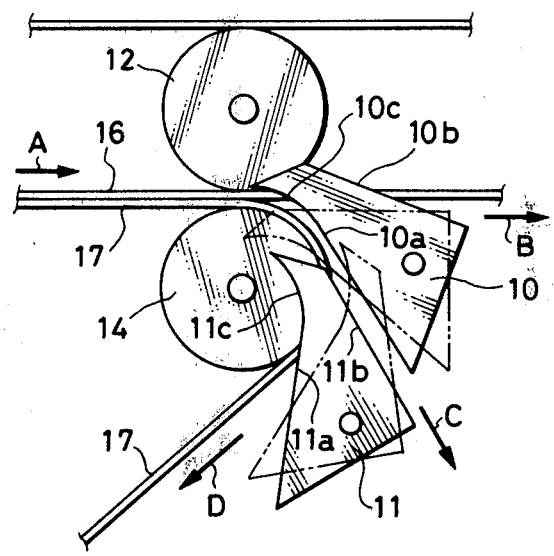
FIG. 3 is a side view showing a guide device according to the present invention.

In FIG. 3, a first fork 10 similar to that of prior art is swingably mounted adjacent and downstream of pulleys 12 and 14 in a similar manner to that of prior art.

A second fork 11 is swingably mounted adjacent and downstream of the pulley 14 and the first fork 10. The side surface 11b of the second fork 11 is disposed to face the side surface 10a of the first fork 10 so that when the first and second forks take the positions as shown in solid lines in FIG. 3, they define a path for bank notes therebetween.

It should be noted that in the present invention, the pulley 15 (or pulleys 15 and 15') and the belt 18 are omitted and the arrangement of the second fork 11 is different from that of prior art in that the straight side surface is not disposed to face the belt 17.

In operation, when the first fork 10 is in the position shown in dotted lines in FIG. 3, the bank notes being transferred are not obstructed by the fork 10 and are, therefore, further conveyed in the direction of the arrow B. When the first and second forks 10 and 11 are in the positions as shown in solid lines in FIG. 3, the bank notes are obstructed by the fork 10 to be deflected, conveyed partially along the belt 17 and then passed into the path defined between the side surface 10a of the fork 10 and the side surface 11b of the fork 11 in the direction of the arrow C. Thus, the bank notes are not conveyed, in a zigzag path. When the first fork 10 is in the position as shown in solid lines in FIG. 3 and the second fork 11 is in the position as shown in dotted lines in FIG. 3, the bank notes are conveyed along the belt 17 throughout in the direction of the arrow D.

What is claimed in:

1. A three direction changeable guide device for use in a bank note handling machine in which bank notes are conveyed and selectively guided into one of these directions which comprises:
   a number of first belts (16) disposed to transfer the bank notes in a first direction (B) therealong,
   a like number of second belts (17) one each disposed to partially engage with one of the first belts (16) and to transfer the bank notes in a second direction (D) along the second belts (17),
   a like number of pulleys (14) one each disposed to deflect one of the second belts (17) from the first direction (B) to second direction (D),
   a like number of first forks (10) one each disposed adjacent and downstream of one of the pulleys (14) in the first direction (B) and adapted to swingably project above the level of the first belts (17) to obstruct the movement of the bank notes in the first direction (B), and
   a like number of second forks (11) one each disposed adjacent and downstream of one of the pulleys (14) and the first forks (10) and adapted to swingably project above the level of the second belts (17) to obstruct the movement of the bank notes in the second direction (D),
   the first forks (10) and the second of forks (11) being disposed to define therebetween a path for bank notes in a third direction (C) when the first forks obstruct the movement of the bank notes in the first direction (13) and the second forks (11) hinder the movement of the bank notes in the second direction (D).

2. A device according to claim 1 wherein each of the first forks (10) and the second forks (11) is of generally triangular shape with one straight side surface (10b, 11b), and one side surface (10a, 11a) with a curved portion (10c, 11c).

3. In a bank note transfer/sorting assembly, having at least two pair of parallel belts, one of said belts of each said pair partially engaging with one of said belts from the other pair, a set of pulleys associated with each of said pair of parallel belts disposed to change direction one of said belts of said pair from the direction of the other belt of such pair, means associated with each pair of parallel belts to deflect said bank note from between said pair of parallel belts to conform to a change in direction of one of the belts of said pair, the improvement comprising:
   a first deflection means associated with a second deflection means and being disposed relative to one another so as to define a third deflection pathway when said first deflection means is positioned to obstruct movement of said bank note from between a first pair of parallel belts to conform to a change in direction of one of said belts of said pair and said second deflection means is positioned to obstruct movement of said bank note from said first pair of parallel belts to said second pair of parallel belts.

4. The assembly of claim 3 wherein said first and second deflector means are located sufficiently adjacent one another to form a path of reduced banknote bending along said third deflection pathway.

5. The assembly of claim 3 wherein said second deflection means has a curved surface on the side thereof facing the banknote as it moves along said path of said one belt between said one belt and said second deflection means and a straight surface on the side thereof facing the banknote as it moves along said third deflection pathway.

* * * * *